United States Patent [19]

Landers

[11] 4,327,792
[45] May 4, 1982

[54] SPREADING NOISE GENERATED BY LOAD SUPPORTING ELEMENTS

[75] Inventor: Samuel P. Landers, Uniontown, Ohio

[73] Assignee: The Goodyear Tire & Rubber Company, Akron, Ohio

[21] Appl. No.: 115,592

[22] Filed: Jan. 25, 1980

Related U.S. Application Data

[63] Continuation of Ser. No. 877,789, Feb. 14, 1978, abandoned.

[51] Int. Cl.³ .............................................. B60C 11/10
[52] U.S. Cl. .............................................. 152/209 R
[58] Field of Search .................... 152/209 R, 209 D

[56] References Cited

U.S. PATENT DOCUMENTS 3,926,238 12/1975 Vorih .............................. 152/209 R
3,998,256 12/1976 Verdier ........................... 152/209 R

*Primary Examiner*—Michael W. Ball
*Attorney, Agent, or Firm*—Frank Pincelli

[57] ABSTRACT

Noise generated by load supporting elements of an apparatus (e.g., tread of a tire) having a plurality of repeating design cycles is spread over a broad frequency spectrum. This is accomplished by designing load bearing elements in accordance with the following procedure.

First, determining the maximum number of repeating design cycles which may be placed about the apparatus;

Second, selecting a maximum pitch ratio;

Third, determining the appropriate number of harmonic segments into which the apparatus can be divided;

Fourth, determining the size of each of the harmonic segments and the number of design cycles for each of the harmonic segments;

Fifth, arranging the various design cycles in each of the harmonic segments so that the wave length of the predominant modulation frequency of the segment corresponds to the fundamental length of that segment.

51 Claims, 13 Drawing Figures

SPREADING NOISE GENERATED BY LOAD SUPPORTING ELEMENTS

This is a Continuation, of application Ser. No. 877,789 filed Feb. 14, 1978 now abandoned.

The foregoing abstract is not to be taken as limiting the invention of this application, and in order to understand the full nature and extent of the technical nature of this application, reference must be made to the accompanying drawings and the following detailed description.

BACKGROUND OF THE INVENTION

This invention relates to a pneumatic tire, more particularly to a tread pattern and method of designing a tread pattern for a pneumatic tire.

As a tire travels upon a surface, there occurs a movement of air, creating an audible sound. For any given tread pattern, a certain amount of energy is produced. While two different tread patterns may produce the same amount of quantum energy, the noise produced by each may have dramatically different effects on people. One tire may sound harsh and disagreeable and the other quite acceptable. The difference between the two sounds is in their frequency spectrum or degree of tonality. Tonality being the condition wherein the sound generated is dominated by a single frequency and its harmonice, i.e., a majority of the sound generated being concentrated into very small frequency range of the sound spectrum. Tonality is psychologically upsetting to a listener, creating an uneasy feeling. Additionally, besides being irritating, tonal sounds can be perceived at greater distances and require more soundproofing material than do non-tonal sounds. If a given concentration of sound energy could be spread out over a wider range of frequency, it would reduce the tonality or undesirability of the sound.

Various methods have been suggested in the past to reduce objectionable noise generated by tires by spreading the energy produced over the frequency range. This is done by modulating the event frequency or characteristic frequency by varying the design cycle length about the tire (also known as pitching). However, these methods ignore the potential tonality in the low frequency range which may result from the pitching itself. As the distance between the repeating design cycles are varied, it is possible to produce an objectionable low frequency sound, which may take the form of a low frequency flutter. This low frequency pitching tonality is readily transmitted to the vehicle and depending upon the vehicle may produce objectionable noise or vibrations.

The primary object of the invention is to effectively reduce the tonality of noise generated by a rotating apparatus having radially extending load carrying elements which produce audible noise by the utilization of a particular method of designing load carrying elements.

It is another object of the invention to modulate the noise produced by a rotating apparatus having load carrying elements by effectively spreading the event frequency energy produced over a wide frequency band, thereby reducing tonality.

A still further object of the invention is to control the selection of modulating frequencies and modulating amplitudes used to accomplish the spreading of the event frequency energy so that it does not introduce low frequency pitching tonality.

These and other objects are met and the disadvantage of the prior art are overcome by utilizing the method of the present invention as more particularly described hereinafter.

SUMMARY OF THE INVENTION

The invention is directed to a method of spreading the noise generated by an apparatus (e.g., tread of a tire) over a broad frequency spectrum and an apparatus made in accordance therewith. The method comprises generally of the following steps:

Selecting the maximum number of repeating design cycles which may be placed about the apparatus;

Selecting a maximum pitch ratio;

Determining the appropriate number of harmonic segments in which the apparatus may be divided into in accordance with the following equation:

Equation No. 1:

$$NS = \frac{NP \times (LP - SP)}{B \times (LP + SP)}$$

where NS is the required number of harmonic sequence segments

NP is the number of pitches (design cycles)

LP is the longest pitch length

SP is the shortest pitch length

B is the modulation index;

Determining the size of each of the harmonic segments and the number of design cycles for each of the harmonic segments;

Arranging the different design cycle lengths in each of the harmonic segments so that the wave length of the predominant modulation frequency of the harmonic segment corresponds to the fundamental length of that segment.

Additionally, to further optimize the spreading of the noise generated, the method may include the steps of determining the proper sequence for the harmonic segments and/or determining the optimum pitch ratio.

DETAILED DESCRIPTION OF THE DRAWINGS

Figure 1:
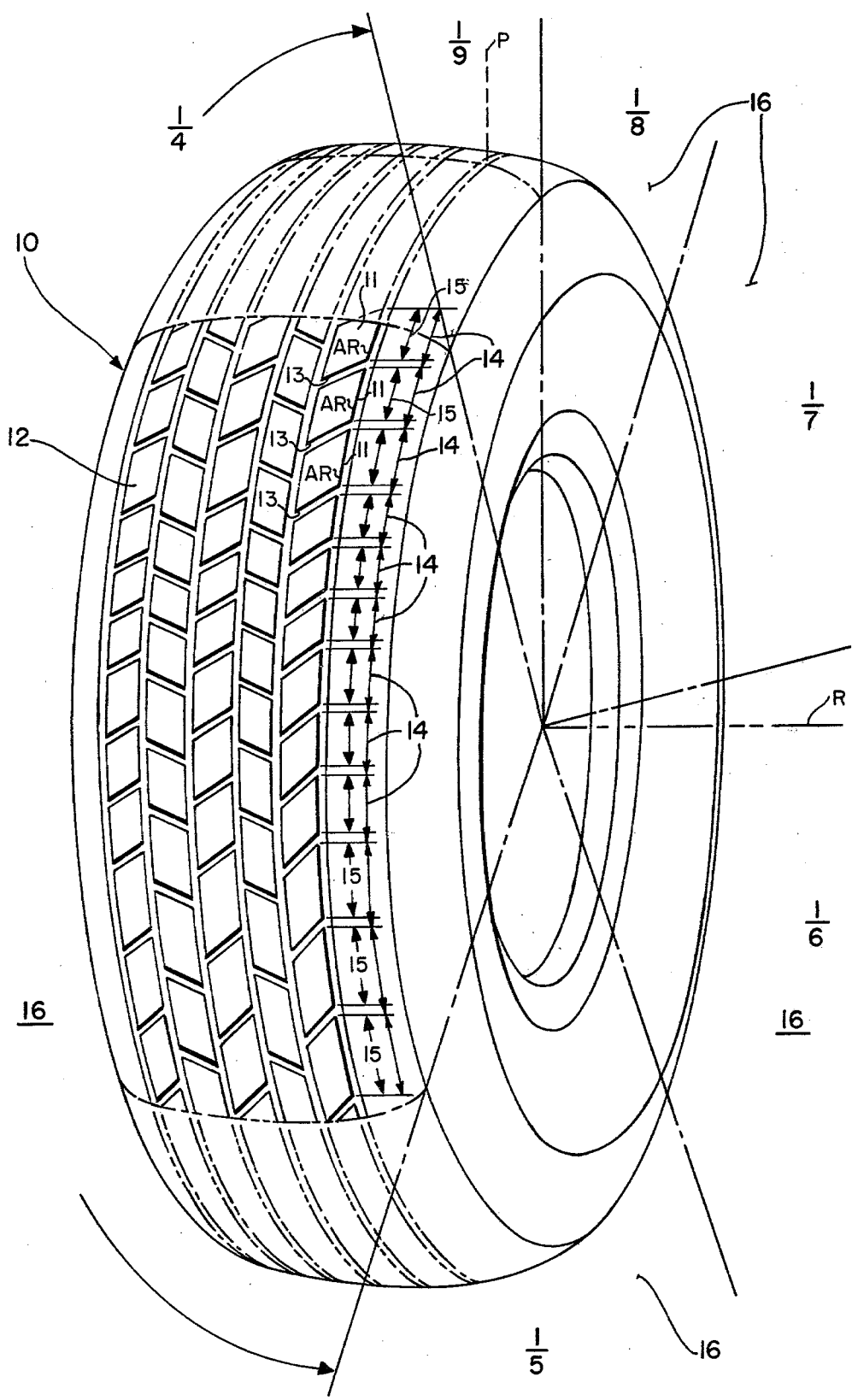
Figure 2:
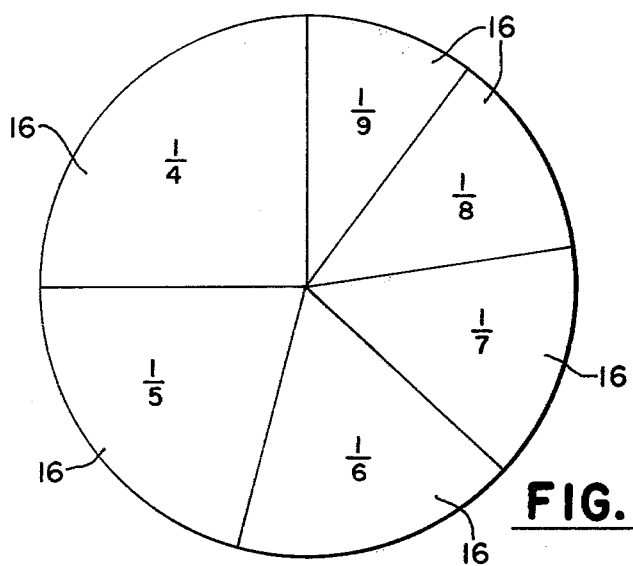
Figure 4:
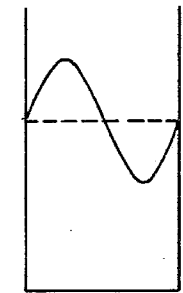
Figure 5:
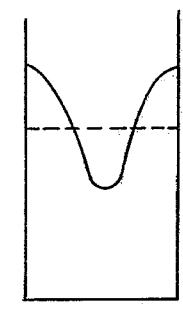
Figure 3:
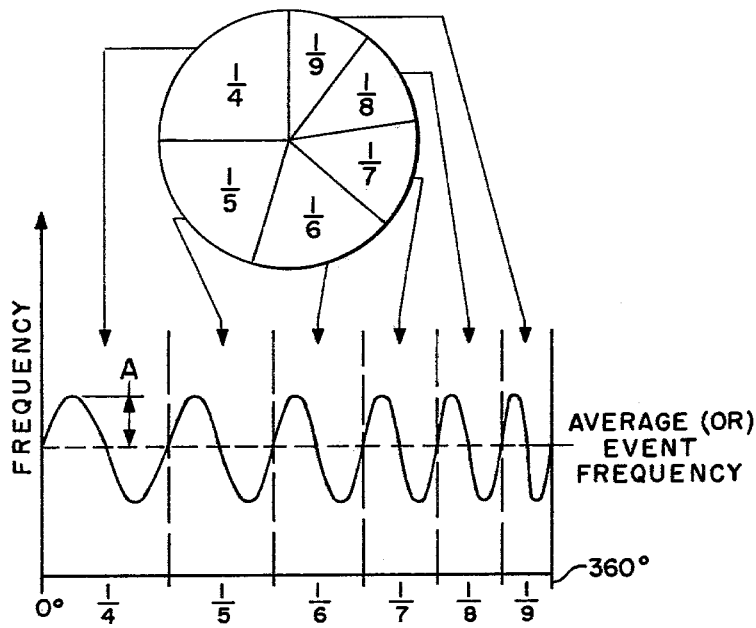
Figure 6:
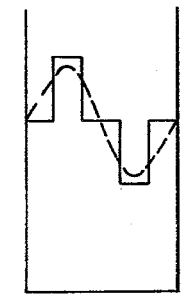
Figure 7:
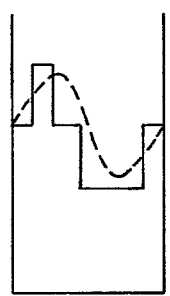
Figure 8:
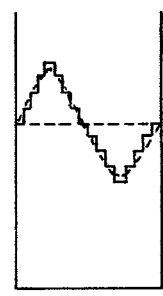
Figure 9:
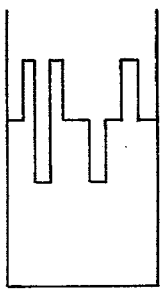
Figure 11:
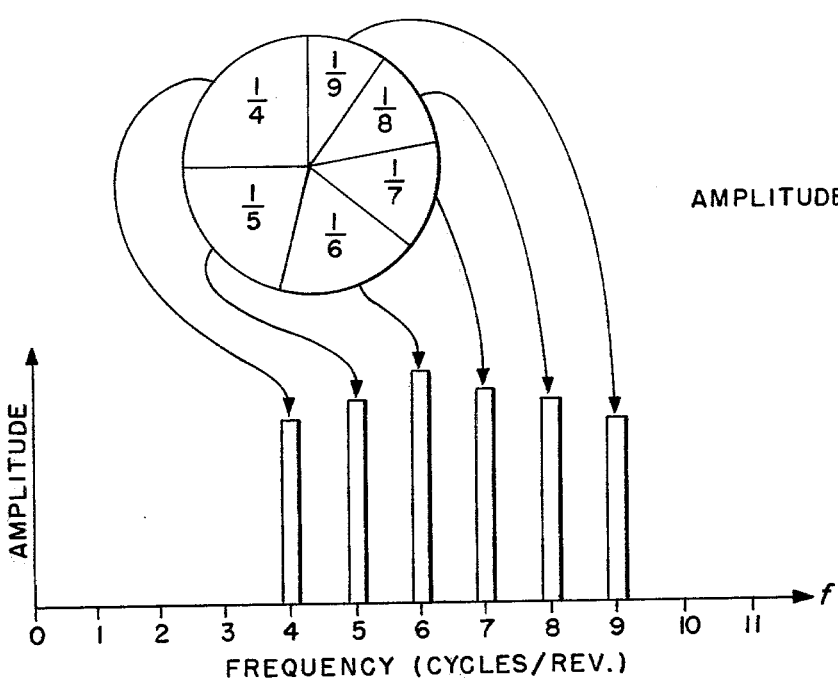
Figure 11:
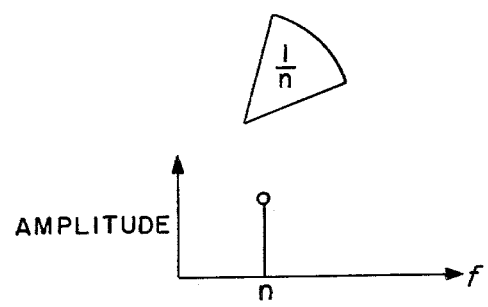
Figure 10:
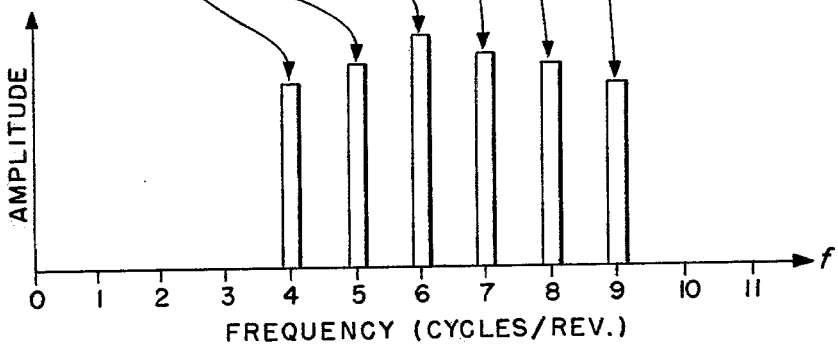
Figure 12:
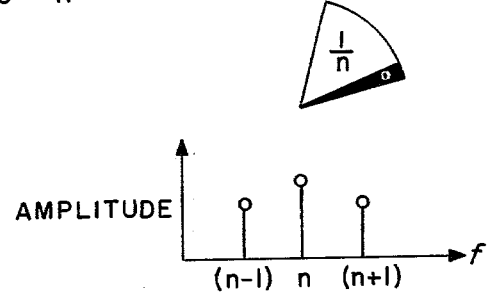
Figure 13:
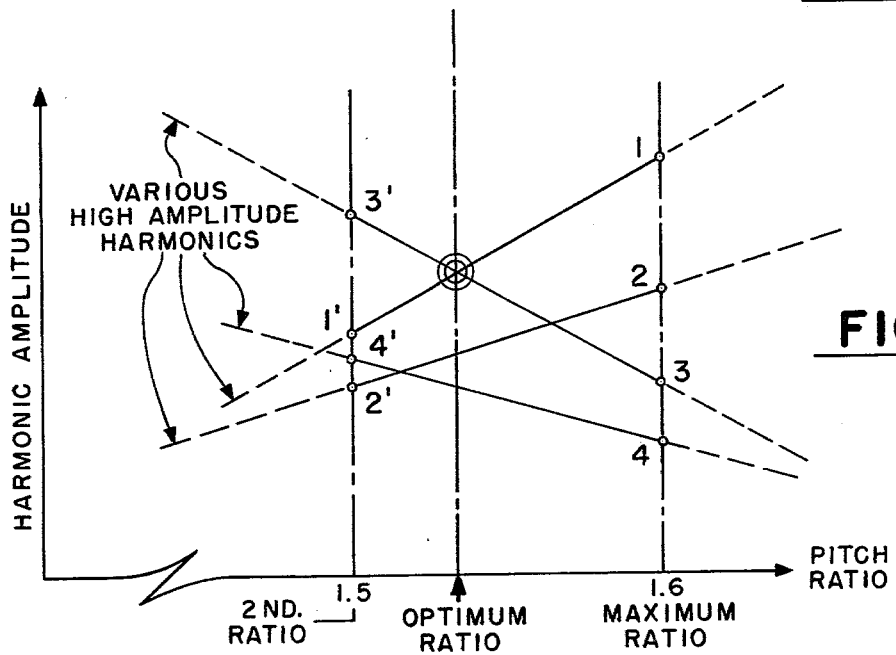

FIG. 1 is a perspective view of a tire having a tread made in accordance with the present invention; and FIG. 2 is a diagrammatical representation illustrating how the tread is divided into a plurality of harmonic sequence segments; and FIG. 3 is a diagrammatical representation illustrating the modulation occurring in each harmonic sequence segment; and FIG. 4 is a diagrammatical representation on how the frequency may be modulated for each of the segments of the tread; and FIG. 5 is a diagrammatical representation illustrating a modified form in which the frequency may be modulated in any one harmonic segment and represents a phase shift from FIG. 4; and FIG. 6 is a diagrammatical representation illustrating a still further modified form in which the frequency may be modulated in any one harmonic segment as represented by three different pitch lengths having a symmetrical pitching sequence; and FIG. 7 is a diagrammatical representation illustrating a still yet another modified form in which the frequency may be modulated in any one harmonic segment as represented by three different pitch lengths having asymmetrical pitching sequence; and FIG. 8 is a diagrammatical representation illustrating another modified form in which the frequency may be modulated in the harmonic segment as represented by multi-pitch lengths; and FIG. 9 is a diagrammatical representation of a frequency modulation which is inconsistent with the teachings of the present invention; and FIG. 10 is a diagrammatical representation illustrating how each of the segments of a tread made in accordance with the present invention corresponds to a different frequency;

FIG. 11 is a diagrammatical representation illustrating how a particular size segment made in accordance with the present invention corresponds to a particular frequency; and FIG. 12 is a diagrammatical representation illustrating how a segment size which is varied from that of the present invention will cause energy to be placed in frequencies other than for which it was designed; and FIG. 13 is a graphical display of the results obtained from a Fourier Analysis conducted on various pitch ratios plotting the amplitude of the highest tonal peaks versus pitch ratio.

DETAILED DESCRIPTION OF THE INVENTION

Referring to FIG. 1, there is illustrated a pneumatic tire 10 having a tread portion 12 made in accordance with the present invention. Tire 10 is adapted to rotate around an axis R. The tread portion 12 extends circumferentially about the tire and is divided into a plurality of repeating design cycles 14. Each design cycle includes a load-bearing element 11 and an adjacent groove 13 which separates adjoining load-bearing elements. In the preferred embodiment, the load-bearing element portion of the design cycle defines a dimensional parameter 15 which is modulated in a manner to be described. Elements 11 are aligned in a plane P perpendicular to axis R, and the intersection of the perimeter of the elements with the plane define arcs of a circle, such as AR. The ratio of the longest design cycle length to the shortest is defined as the "pitch ratio". The particular arrangement of these different design cycle length segments is the "pitch sequence". The particular pitch sequence and pitch ratio are both very important in the spreading of the sound energy over a wide range of frequencies. The maximum number of pitches that can be used will depend on how short the design cycle length may be. Generally, it is desirable to have the length of design cycle 14 as short as possible without causing physical distortion or unstable tread elements that might cause irregular wear. Accordingly, the first step in designing tread 12 is determining the maximum number of design cycles 14 that can be used for the particular design contemplated. At the present time, passenger tires generally have from about 30 to about 100 pitches, preferably from about 45 to 75; however, the present invention is not limited to such.

After the maximum number of design cycles 14 is selected, the maximum pitch ratio can be determined. Based on the maximum number of pitches previously selected, a pitch ratio is selected as large as possible so as to optimize the effectiveness of the pitching. The selection is generally based on practical performance characteristics. Presently, tires generally have a pitch ratio up to about 1.86 and preferably from about 1.4 to 1.6; however, the present invention may have any desired pitch ratio. In the particular tread illustrated, the pitch ratio is 1.57.

The tread circumference is then divided into the appropriate number of circumferential harmonic sequence segments 16 (See in FIG. 2) determined in accordance with the following relationship:

Equation No. 1:

$$NS = \frac{NP \times (LP - SP)}{B \times (LP + SP)}$$

where NS is the required number of harmonic sequence segments

NP is the number of pitches (design cycles)
LP is the longest pitch length
SP is the shortest pitch length
B is the modulation index For the purpose of this invention, a harmonic sequence segment comprises of a plurality of adjacent design cycles 14 having various lengths, arranged such that the wave length of the predominant modulating frequency of that segment, that is the modulating frequency having the highest amplitude, corresponds to the fundamental length of that segment. This can be better understood by referring to FIGS. 3 and 4. The calculated number of harmonic segments 16, determined from Equation No. 1 is rounded to the nearest whole number, fractional segments being undesirable. Additionally, there should be a minimal number of harmonic segments. The fewer number of segments 16, the better will be the tonality reduction; however, the fewer number of segments increases the chance of introducing low frequency tonality. The minimum number of harmonic segments 16 which can be used for any particular size tire is determined in accordance with the following relationship:

Equation No. 2:

$$fs = \frac{Nm \times S}{C}$$

where fs is frequency
Nm is the minimum number of harmonic sequence segments
S is the tire speed
C is the tire circumference The speed at which tire noise is generally loud enough to be perceived by the human ear is approximately 30 miles per hour. Substituting this value into Equation No. 2, the following is obtained:

Equation No. 3:

$$fs = \frac{Nm \times 30 \text{ miles per hour}}{C} \quad (48.28 \text{ kilometer/hr})$$

Frequencies less than 30 cycles per second are not generally audible to the human ear but may be perceived as beating and therefore should be avoided. Substituting, Equation No. 3 reduces to:

Equation No. 4:

$$Nm > \frac{C}{44.704}$$

where C is in centimeters

For a passenger tire having an outside diameter of approximately 66.04 cm, the circumference is equal to about 203.2 cm. Substituting for C, it can be seen that the number of harmonic sequence segments Nm should be greater than 4.545. Since there can only be a whole number of harmonic segments 16, this number is rounded to the next whole integer; therefore, the number of harmonic sequence segments 16 for this particular tire would be at least 5. The rounding of 4.545 to 5 is an example of normal rounding in which any decimal fraction equal to 0.50 or greater is rounded off to the next larger whole number and any decimal fraction less than 0.50 is rounded off to the next smaller whole number. This value should then be compared with NS calculated from Equation No. 1. If Nm is greater than NS, new values for B should be selected until NS is greater than Nm. If changing B will not correct this, then initial design criteria should be changed, e.g., NP, LP or NP.

The index of modulation in Equation No. 1 is the amplitude of the frequency variation divided by the frequency at which the tone is varied. This can be better understood by reference to FIG. 3 wherein the amplitude of the frequency variation from the event frequency is illustrated by the letter A. The index of modulation controls how much energy is present in each of the side bands of the event frequency and the effectiveness of the pitching. Modulation indices less than 1 are generally ineffective for tire pitching and modulation indices greater than 4 are generally impractical because of limitations due to mold manufacturing, the possibility of irregular wear and the poor visible appearance of the tire. An example of two good modulation indices for pitching are approximately 1.6 and approximately 2.9; because, the fundamental and next greater side bands have nearly equal amplitude.

Equation No. 1 is based on a purely sinusoidal modulation; when the modulation is complex (i.e., made of several modulations), the modulation must be broken down into component parts. The amplitude of the fundamental harmonic frequency is the only one to be considered. When the modulation is not of a purely sinusoidal type as illustrated in FIGS. 4 and 5 a shape factor must be considered in calculating NS. Dotted lines in FIGS. 6, 7 & 8 illustrate the fundamental frequency for that wave form. The shape factor corrects for the fact that the amplitude of fundamental frequency is less than the actual amplitude of complex frequency modulations. Therefore, taking shape factor into consideration, Equation No. 1 is corrected to the following equation:

Equation No. 5:

$$NS = \frac{NP \times (LP - SP)}{B \times (LP + SP)} \times SF$$

wherein SF is the term which corrects for this shape.

By way of example, and for the purpose of illustration, a passenger tire having 35 pitches, 3 design cycle lenghts, a long design cycle length of 7.093 cm, a short design cycle length of 4.518 cm, a modulation index of 1.6 and a shape factor of 1.1, correcting for the non-sinusoidal shape of the 3 pitch sequence, has a calculated number of harmonic segments equal to 5.336, which rounds off to 5 segments; this number being greater than the minimum number of harmonic segments Nm calculated in accordance with Equation No. 4.

Once the number of harmonic segments NS have been determined, the segment sizes are selected from a portion of the harmonic series, represented by the following progression:

$$\frac{1}{1}, \frac{1}{2}, \frac{1}{3}, \frac{1}{4} \cdots \frac{1}{n}$$

The portion of the harmonic series selected will contain the same number of terms as there are segments, these terms preferably being in consecutive order. The size of each segment corresponds to one of the terms of the progression. For example, if one segment corresponds to $\frac{1}{4}$, then the size of that segment is equal to one-fourth ($\frac{1}{4}$) of the circumference of the tire. It is desirable that the sum of the terms of the series will be nearly equal to 1. For example, if six segments are desired, six consecutive terms would be chosen from the series as follows:

$$\frac{1}{4} + \frac{1}{5} + \frac{1}{6} + \frac{1}{7} + \frac{1}{8} + \frac{1}{9}$$

The sum of which is approximately equal to 0.996, which is very nearly equal to 1. This procedure forces each of the segments to correspond to a different low frequency modulation and effectively spreads the low frequency energy in a broad band as illustrated in FIG. 8. Up to now, the size of each segment has only been approximated. The next step is to determine the actual size of each segment. Taking each of the terms of the harmonic series, a common divisor is determined by multiplying all of the denominators of all the terms. Then each of the numerators of each term the multiplied by all of the denominators of the other terms of the series chosen. After that has been done, the numerators of each harmonic series term and added and placed over the common divisor; generally, the total numerator and denominator will not be the same. The total numerator obtained as a result of adding all the numerators is now used as the denominator for each harmonic term. Using the numerator calculated for each term, the adjusted fractional share of each term is determined.

An example of this for a tread having six (6) harmonic sequence segments is:

| Harmonic Series Term | | Common Divisor | Adjusted Fraction |
|---|---|---|---|
| $\frac{1}{4}$ | = | $\frac{15,120}{60,480}$ | $\frac{15,120}{60,216}$ |
| $\frac{1}{5}$ | = | $\frac{12,096}{60,480}$ | $\frac{12,096}{60,216}$ |
| $\frac{1}{6}$ | = | $\frac{10,080}{60,480}$ | $\frac{10,080}{60,216}$ |
| $\frac{1}{7}$ | = | $\frac{8,640}{60,480}$ | $\frac{8,640}{60,216}$ |
| $\frac{1}{8}$ | = | $\frac{7,560}{60,480}$ | $\frac{7,560}{60,216}$ |
| $\frac{1}{9}$ | = | $\frac{6,720}{60,480}$ | $\frac{6,720}{60,216}$ |
| TOTAL | = | $\frac{60,216}{60,480}$ | 1 |

To determine the number of actual pitches that is required in each segment, multiply the adjusted fractional size of the particular segment times the total number of pitches in the tire. This number is then rounded up or down to the nearest whole number. Rounding up means rounding any fractional portion of a whole number up to the next whole number greater in value. Rounding down means rounding any fractional portion of a whole number down to the next whole number less in value. As used in this specification and claims, a rounded number is a number obtained by normal rounding, rounding up or rounding down as previously defined. Occasionally the sum of the pitches contained in each segment does not total up to the required number of pitches because of round-off error. When this occurs, adjust the number of pitches either up or downward in the segment that was rounded the greatest amount in the direction required to correct the total number of pitches. For example,

| Harmonic Series Term | Adjusted Fraction | | Total Pitches | | Required Pitches | Rounded |
|---|---|---|---|---|---|---|
| $\frac{1}{4}$ | $\frac{15,120}{60,216}$ | × | 35 | = | 8.79 | 9(−1) |
| $\frac{1}{5}$ | $\frac{12,096}{60,216}$ | × | 35 | = | 7.03 | 7 |
| $\frac{1}{6}$ | $\frac{10,080}{60,216}$ | × | 35 | = | 5.86 | 6 |
| $\frac{1}{7}$ | $\frac{8,640}{60,216}$ | × | 35 | = | 5.02 | 5 |
| $\frac{1}{8}$ | $\frac{7,560}{60,216}$ | × | 35 | = | 4.39 | 4 |
| $\frac{1}{9}$ | $\frac{6,720}{60,216}$ | × | 35 | = | 3.91 | 4 |
| | | | | | TOTAL | 36(−1) = 35 |

There may be certain instances in which 2 segments may require the same number of pitches. In such event the larger of 2 harmonic segments will comprise of a greater number of long design cycle lengths than the smaller segment. Therefore, the harmonic sequence segments are made to correspond to its design frequency. In any event there must be a whole number of pitches contained in any one particular harmonic segment 16, a fractional pitch is undesirable.

The pitching sequence for each harmonic segment 16 may vary; however, each harmonic segment 16 should have a predominant modulation frequency which corresponds to the fundamental frequency of that segment. As previously stated, a harmonic segment is one wherein the wave length of the predominant modulating frequency of that segment, that is the modulating frequency having the highest amplitude, corresponds to the fundamental length of that segment. FIG. 9 illustrates a non-harmonic segment wherein the predominant modulating frequency does not correspond to the segment period. Preferably, a harmonic segment is obtained by slowly changing the pitch length from one extreme to the other and back again in a substantially sinusoidal pattern (i.e., by completing one modulation cycle) only once in each segment as is illustrated in FIG. 4. FIG. 3 illustrates this sinusoidal pattern for the entire circumference of the tread. In the present invention, this modulation is accomplished through the use of three design cycle lengths arranged in a symmetrical sequence as illustrated in FIG. 6. However, any desired number of different pitch lengths may be used. In the embodiment illustrated, the pitch length in between the longest and shortest pitch lengths is the average of the two. The following sequences are suggested for a three pitch type tread design having various pitches per segment. However, various other sequences may be used to achieve the same result.

| Number of Pitches in Segment | Pitching Sequence |
|---|---|
| 4 | 1232 |
| 5 | 12232 |

-continued

| Number of Pitches in Segment | Pitching Sequence |
|---|---|
| 6 | 112332 |
| 7 | 1122332 |
| 8 | 11223322 |
| 9 | 111223332 |
| 10 | 1112223332 |
| 11 | 11122233322 |
| 12 | 111222333222 |
| 13 | 1111222233332 |
| 14 | 11112222333322 |
| 15 | 111122223333222 |
| 16 | 1111222233332222 |
| 17 | 11111222223333322 |
| 18 | 111112222233333222 |
| 19 | 1111122222333332222 |
| 20 | 11111222223333322222 |
| 21 | 111112222233333222222 |

Each of these pitching sequences illustrates a complete period of design cycle length modulation and one complete modulation cycle. The greater number of pitch lengths used, the more closely one can approach a true sinusoidal shape. In any event, there should be at least two pitch lengths. FIG. 8 shows the use of multiple pitches; FIG. 7 shows an unsymmetrical pitching sequence using three different pitch lengths; and FIG. 5 shows a phase shift from the basic sinusoidal modulation. In FIGS. 4 to 8, the predominant frequency modulation frequency corresponds to the segment period.

While the size of segments 16 are preferably made very close to the calculated values, the size of segment 16 may vary by as much as 25% in length, preferably, less than 10%. A 25% variation in length represents one-quarter of the wave length of modulation. Variations beyond this limit would cause modulations other than where desired. For example, an ideal segment size would result in a harmonic of a particular low frequency as is illustrated in FIG. 11; whereas, a variation of about 25% or greater would not only cause energy to be put in the particular frequency designed for, but would also put unacceptable amounts of energy in the next order lower, or higher, frequency, as illustrated in FIG. 12. The amplitude of each of the modulating frequencies within a segment can be checked by performing a Fourier Analysis of the frequency modulation caused by the pitching sequence in that segment. The amplitude of the fundamental frequency should be greater than any of the harmonics. The tread pattern can further be refined by proper placement of each harmonic segment. The order in which the segments are arranged may cause a cancellation or reinforcement between each of the segments. Therefore, it is desired to keep the contribution of each segment nearly equal so that the low frequency spectrum is smooth and broad. Generally, this can be accomplished by arranging the segment so that the sizes are mixed up in order; i.e., the sizes are not in consecutive order. The following are examples of segment sequences having been found to be satisfactory for tires having six segments:

| Number of Segments | |
|---|---|
| 6 | $\frac{1}{4}, \frac{1}{9}, \frac{1}{6}, \frac{1}{5}, \frac{1}{8}, \frac{1}{7}$ |

The following segment sequences, by way of example only, have been found to be satisfactory for tires having 4, 5 and 7 segments:

| Number of Segments | |
|---|---|
| 4 | $1, 1, \frac{1}{6}, \frac{1}{5}$ |
| 5 | $1, \frac{1}{7}, \frac{1}{5}, \frac{1}{6}, 1$ |
| 7 | $1, \frac{1}{6}, \frac{1}{9}, \frac{1}{5}, \frac{1}{7}, \frac{1}{10}, 1$ |

To take full advantage of the pitch sequence, the pitch ratio should be optimized. Initially, an upper limit for the pitch ratio was subjectively selected. However, there could very likely be a slightly lower pitch ratio that produces a less tonal sound for any given tire pitch sequence. Whether or not there exists an optimum pitch ratio less than the one originally selected can be determined by performing two Fourier Analyses. The first is performed using the maximum pitch ratio originally selected. The second Fourier Analysis is performed using a pitch ratio that is slightly smaller than the originally selected ratio. By plotting the amplitude of the highest tonal peaks calculated in each analysis versus the pitch ratio, it can be determined if a smaller optimum ratio can be used.

First, the highest frequency peak calculated from the Fourier Analysis on the original pitch ratio is plotted. Then the amplitude of the same frequency calculated in the second Fourier Analysis is plotted. The two points are then connected by a straight line. If the line slopes upward as the pitch ratio is increased, a smaller optimum ratio is possible. Next, plot in the same manner the amplitude of the next highest frequency peak that occur in both analyses. Then these two points should be connected by a straight line. Repeat this procedure for the next two highest frequency peaks found in both analyses. The optimum ratio can then be picked off the graph where the difference between the amplitude of all the lines plotted is the least as is illustrated in Figure. This procedure should be repeated for the new optimum ratio because the straight-line method is only an approximation. When the difference between the original pitch ratio and the calculated optimum ratio is about 2% of less, this procedure may be stopped.

The resulting pitch sequence will have a white or pink noise characteristic. For purposes of this invention, white noise shall be defined as sounds in which there is an equal sound intensity in all frequencies in the audible spectrum and pink noise shall be defined as the sound in which the intensity decreases at a rate of three decibals per octave in the frequency spectrum. The sound that is heard when a seashell is placed next to the ear is representative of white noise and pink noise sounds similar to white noise except that it does not have as much high frequency hissing sound; it has a more hollow sound.

While the invention has been described in detail with reference to the tread of a tire, the present invention may be generally applied to rotating apparatus having radially extending load bearing elements. By way of example, V-belts provided with triangularly extending notches for turning about a small radius may take advantage of the present invention by notching the belt in accordance with the teachings herein described. The present invention is applicable for use on snowmobile tracks.

While certain representative embodiments and details have been shown for the purpose of illustrating the invention, it will be apparent to those skilled in the art that various changes and other modifications may be made therein without departing from the spirit or scope of the invention.

What is claimed is:

1. In an apparatus provided with a plurality of surface-engaging design cycles located on a curved face of the apparatus, said design cycles defining a dimensional parameter varying in a predetermined manner, an improved arrangement in which:

the design cycles are divided into a plurality of not less than three complete modulation cycles of different lengths, the rounded fractional portions of the curved face represented by the different lengths corresponding to three different terms of the group consisting of the first nine terms of the harmonic series, whereby the character of the sound emitted when the design cycles move against a surface is altered.

2. In a tire adapted to rotate around an axis, the tire being provided with a plurality of circumferentially extending tread design cycles defining a dimensional parameter varying in a predetermined manner, an improved tread arrangement in which:

the design cycles are divided into a plurality of not less than three complete modulation cycles of different lengths, the rounded fractional portions of the circumference represented by the different lengths corresponding to three different times of the group consisting of the first nine terms of the harmonic series, whereby the character of the sound emitted when the tire rotates against a road surface is altered.

3. A tread for a tire adapted to rotate around an axis, the tread comprising a plurality of circumferentially extending tread design cycles defining a dimensional parameter varying in a predetermined manner in which:

the design cycles are divided into a plurality of not less than three complete modulation cycles of different lengths, the rounded fractional portions of the circumference represented by the different lengths corresponding to three different terms of the group consisting of the first nine terms of the harmonic series, whereby the character of the sound emitted when the tire rotates against a road surface is altered.

4. A tire provided with a tread having a plurality of load supporting elements placed about the circumference of said tire, said tread comprising:

a plurality of repeating design cycles placed continuously about the circumference of said tire, said design cycles having at least two different pitch lengths and arranged about said tread so as to provide a plurality of not less than three harmonic segments, the design cycle lengths in each of said harmonic segments having a different period, the rounded fractional portions of the circumference represented by the different periods of the three harmonic segments corresponding to three different terms of the group consisting of the first nine terms of the harmonic series, each of said harmonic segment periods corresponding to a different frequency in the sound spectrum.

5. A tire provided with a tread having a plurality of load supporting elements placed about the circumference of said tire, said tread comprising:

a plurality of repeating design cycles placed continuously about the circumference of said tie, said design cycles having at least two different pitch lengths and arranged about said tread so as to provide a plurality of not less than three harmonic segments, the design cycle lengths in each said harmonic segment having a different period, the relative difference between the largest and second largest of said three periods being at least as great as the relative difference between the seventh and eighth terms of the harmonic series and the relative difference between the second largest and smallest of said three periods being at least as great as the relative difference between the eighth and ninth terms of the harmonic series, the sum of said three periods occupying at least one-half of the circumference of the tire, each of said three harmonic segment periods corresponding to a different frequency in the sound spectrum, the remainder of the circumference unoccupied by said three segments comprising additional design cycle lengths having a plurality of additional periods each smaller than the periods of said three segments, the sum of any of the additional periods which are substantially identical being less than the period of the smallest of said three harmonic segments.

6. In a tire adapted to rotate around an axis, the tire being provided with a plurality of circumferentially extending tread design cycles defining a dimensional parameter varying in a predetermined manner, an improved tread arrangement in which:

the design cycles are divided into a plurality of not less than three complete modulation cycles of different lengths, the relative difference between the largest and second largest of said three lengths being at least as great as the relative difference between the seventh and eighth terms of the harmonic series and the relative difference between the second largest and smallest of said three lengths being at least as great as the relative difference between the eighth and ninth terms of the harmonic series, the sum of said three lengths occupying at least one-half the circumference of the tire, said tire tread comprising one or more additional complete modulation cycles having one or more additional lengths shorter than any of said three lengths, the sum of any of the additional lengths which are substantially identical being less than the smallest of said three lengths.

7. A tread for a tire adapted to rotate around an axis, the tread comprising a plurality of circumferentially extending tread design cycles defining a dimensional parameter varying in a predetermined manner in which:

the design cycles are divided into a plurality of not less than three complete modulation cycles of different lengths, the relative difference between the largest and second largest of said three lengths being at least as great as the relative difference between the seventh and eighth terms of the harmonic series and the relative difference between the second largest and smallest of said three lengths being at least as great as the relative difference between the eighth and ninth terms of the harmonic series, the sum of said three lengths occupying at least one-half the circumference of the tread, said tread comprising one or more additional complete modulation cycles having one or more additional lengths shorter than any of said three lengths, the sum of any of the additional lengths which are substantially identical being less than the smallest of said three lengths.

8. In an apparatus provided with a plurality of surface-engaging design cycles located on a curved face of the apparatus, said design cycles defining a dimensional parameter varying in a predetermined manner, an improved arrangement in which:

the design cycles are divided into a plurality of not less than three complete modulation cycles of different lengths, the relative difference between the largest and second largest of said three lengths being at least as great as the relative difference between the seventh and eighth terms of the harmonic series and the relative difference between the second largest and smallest of said three lengths being at least as great as the relative difference between the eighth and ninth terms of the harmonic series, the sum of said three lengths occupying at least one-half the curved face of the apparatus, said face comprising one or more additional complete modulation cycles having one or more additional lengths shorter than any of said three lengths, the sum of any of the additional lengths which are substantially identical being less than the smallest of said three lengths.

9. A tire, as claimed in claim 4, wherein the sum of said three different terms is greater than one-half.

10. A tire, as claimed in claim 4, comprising additional harmonic segments in addition to said three segments, none of the additional harmonic segments having a period substantially identical to the period of any one of said three segments.

11. A tire, as claimed in claim 4, wherein the denominators of said three different terms include both odd and even integers.

12. A tire, as claimed in claim 4, wherein said three different terms comprise consecutive terms of the harmonic series.

13. A tire, as claimed in claim 4, comprising said three segments and additional segments in which the design cycle lengths have a plurality of predetermined periods each smaller than the periods in said three segments, the sum of any of the additional periods which are substantially identical being less than the period of the smallest of said three harmonic segments.

14. A tire, as claimed in claims 4 or 5, wherein the number of harmonic segments is at least as large as a number equal to the circumference of the tire measured in centimeters divided by 44.704, but not less than three.

15. A tire, as claimed in claims 4 or 5, wherein substantially the entire circumference of the tire is divided into a plurality of harmonic segments and the rounded fractional portions of the circumference represented by the segments correspond to terms of the harmonic series.

16. A tire, as claimed in claim 15, wherein the sequence in which said harmonic segments is arranged is different than the sequence in which the corresponding terms of said harmonic series is arranged.

17. A tire, as claimed in claim 15, wherein substantially all said terms are within the group consisting of the first nine terms of the harmonic series.

18. A tire, as claimed in claims 4 or 5, wherein the total number of segments is proportional to:

$$\frac{NP \times (LP - SP)}{(LP + SP)}$$

wherein NP is the number of design cycles
LP is the maximum pitch length
SP is the minimum pitch length.

19. A tire, as claimed in claims 4 or 5, wherein the second largest of said three segments is more than half of the largest of said three segments, and the smallest of said three segments is more than half of the second largest of said three segments.

20. A tire, as claimed in claim 4, wherein the tire is divided into a plurality of harmonic segments and the rounded fractional portions of the segments extending over at least 90 percent of the circumference correspond to terms of the group consisting of the first nine terms of the harmonic series.

21. A tire, as claimed in claims 4, 5, 9, 10, 13 or 20 wherein each of said three harmonic segments has a length substantially equal to one complete period of variation of the design cycles.

22. An article, as claimed in claims 2, 3 or 1, wherein the sum of said three different terms is greater than one-half.

23. An article, as claimed in claims 2, 3 or 1, comprising additional modulation cycles in addition to said three cycles, none of the additional modulation cycles having a length substantially identical to the length of any one of said three cycles.

24. An article, as claimed in claims 2, 3 or 1, wherein the denominators of said three different terms include both odd and even integers.

25. An article, as claimed in claim 24, wherein said three different terms comprise consecutive terms of the harmonic series.

26. An article, as claimed in claims 2, 3 or 1, and further comprising one or more additional complete modulation cycles having one or more additional lengths shorter than any of said three lenths, the sum of any of the additional lengths which are substantially identical being less than the smallest of said three lengths.

27. An article, as claimed in claims 2, 3, 1, 6, 7 or 8, wherein the number of modulation cycles is at least as large as a number equal to the circumference of the tire measured in centimeters divided by 44.704, but not less than three.

28. An article, as claimed in claims 2, 3, 6 or 7, wherein substantially the entire circumference is divided into a plurality of modulation cycles and the rounded fractional portions of the circumference represented by the cycles correspond to terms of the harmonic series.

29. An article, as claimed in claim 6, wherein the sequence in which cycles are arranged is different than the sequence in which the corresponding terms of said harmonic series is arranged.

30. An article, as claimed in claim 28, wherein substantially all said terms are within the group consisting of the first nine terms of the harmonic series.

31. An article, as claimed in claims 2, 3, 1, 6, 7 or 8, wherein the total number of modulation cycles is proportional to $$\frac{NP \times (LP - SP)}{(LP + SP)}$$

wherein NP is the number of design cycles
LP is the maximum dimensional parameter value
SP is the minimum dimensional parameter value.

32. An article, as claimed in claims 2, 3, 1, 6, 7 or 8, wherein the second largest of said three cycles is more than half of the largest of said three cycles, and the smallest of said three cycles is more than half of the second largest of said three cycles.

33. An article, as claimed in claims 2 or 3, wherein the article is divided into a plurality of modulation cycles, and the rounded fractional portions of the cycles extending over at least 90 percent of the circumference correspond to terms of the group consisting of the first nine terms of the harmonic series.

34. An article, as claimed in claims 2, 3, 1, 6, 7, or 8, wherein each design cycle comprises a load-bearing element and an adjacent groove and wherein the load-bearing element defines the dimensional parameter.

35. An article, as claimed in claims 2, 3, 1, or 7, wherein the design cycles are located in a plane perpendicular to the axis, wherein the intersection of the plane with the outer perimeter of the cycles defines arcs of a circle, wherein each design cycle comprises a load-bearing element and an adjacent groove, and wherein the dimensional parameter is defined by a portion of the load-bearing element extending along the circle.

36. A method of manufacturing the tread of a tire adapted to rotate around an axis, the tread being provided with a plurality of circumferentially extending tread design cycles defining a dimensional parameter varying in a predetermined manner, said method comprising the steps of:
dividing the design cycles into a plurality of not less than three complete modulation cycles of different lengths, and
arranging the rounded fractional portions of the circumference represented by the different lengths to correspond to three different terms of the group consisting of the first nine terms of the harmonic series, whereby the character of the sound emitted when the tread rotates against a road surface is altered.

37. A method of manufacturing the tread of a tire adapted to rotate around an axis, the tread being provided with a plurality of circumferentially extending tread design cycles defining a dimensional parameter varying in a predetermined manner, said method comprising the steps of:
dividing the design cycles into a plurality of not less than three complete modulation cycles of different lengths;
arranging the relative difference between the largest and second largest of said three lengths to be at least as great as the relative difference between the seventh and eighth terms of the harmonic series;
arranging the relative difference between the second largest and smallest of said three lengths to be at least as great as the relative difference between the eighth and ninth terms of the harmonic series;
arranging the sum of said three lengths to occupy at least one-half the circumference of the tread; and
providing said tread with one or more additional complete modulation cycles having one or more additional lengths shorter than any of said three lengths, the sum of any of the additional lengths which are substantially identical being less than the smallest of said three lengths.

38. A method, as claimed in claim 36, wherein the sum of said three different terms is greater than one-half.

39. A method, as claimed in claim 36, and further comprising the step of adding additional modulation cycles in addition to said three cycles, none of the additional modulation cycles having a length substantially identical to the length of any one of said three cycles.

40. A method, as claimed in claim 36, wherein the denominators of said three different terms include both odd and even integers.

41. A method, as claimed in claim 40, wherein said three different terms comprise consecutive terms of the harmonic series.

42. A method, as claimed in claim 36, and further comprising the step of adding one or more additional complete modulation cycles having one or more additional lengths shorter than any of said three lengths, the sum of any of the additional lengths which are substantially identical being less than the smallest of said three lengths.

43. A method, as claimed in claims 36 or 37 wherein the number of modulation cycles is at least as large as a number equal to the circumference of the tire measured in centimeters divided by 44.704, but not less than three.

44. A method, as claimed in claims 36 or 37, and further comprising the step of dividing substantially the entire circumference of the tire into a plurality of modulation cycles and arranging the rounded fractional portions of the circumference represented by the cycles to correspond to terms of the harmonic series.

45. A method, as claimed in claim 44, wherein the sequence in which cycles are arranged is different than the sequence in which the corresponding terms of said harmonic series is arranged.

46. A method, as claimed in claim 44, wherein substantially all said terms are within the group consisting of the first nine terms of the harmonic series.

47. A method, as claimed in claims 36 or 37 wherein the total number of modulation cycles is proportional to:

$$\frac{NP \times (LP - SP)}{(LP + SP)}$$

Wherein NP is the number of design cycles
LP is the maximum dimensional parameter value
SP is the minimum dimensional parameter value.

48. A method, as claimed in claims 36 or 37, wherein the second largest of said three cycles is more than half of the largest of said three cycles, and the smallest of said three cycles is more than half of the second largest of said three cycles.

49. A method, as claimed in claim 36, and further comprising the step of dividing the tire into a plurality of modulation cycles, and arranging the rounded fractional portions of the cycles extending over at least 90 percent of the circumference to correspond to terms of the group consisting of the first nine terms of the harmonic series.

50. A method, as claimed in claims 36, 37, 38, 39, 40, 41, 42, 44, 45 or 49, and further comprising the steps of arranging each design cycle to include a load-bearing element and an adjacent groove and arranging the load-bearing element to define the dimensional parameter.

51. A method as claimed in claims 36, 37, 38, 39, 40, 41, 42, 44, 45 or 49, and further comprising the steps of locating the tread design cycles in a plane perpendicular to the axis, so that the intersection of the plane with the outer perimeter of the cycles defines arcs of a circle, arranging each design cycle to include a load-bearing element and an adjacent groove, and defining the dimensional parameter by a portion of the load-bearing element extending along the circle.

* * * * *

Disclaimer

4,327,792.—*Samuel P. Landers*, Uniontown, Ohio. SPREADING NOISE GENERATED BY LOAD SUPPORTING ELEMENTS. Patent dated May 4, 1982. Disclaimer filed Sept. 2, 1982, by the assignee, *The Goodyear Tire & Rubber Co.*

Hereby enters this disclaimer to claims 1, 2, 3, 22, 24, 25, 33, 36, 38, 40, 41 and 49 of said patent.

[*Official Gazette November 23, 1982.*]